United States Patent

[11] 3,533,448

| [72] | Inventor | Edward H. Fullerton I,<br>Tigard, Oreg.<br>(10800 SW. 71, Portland, Oreg. 97223) |
|---|---|---|
| [21] | Appl. No. | 674,077 |
| [22] | Filed | Oct. 9, 1967 |
| [45] | Patented | Oct. 13, 1970 |

[54] HYDRO PNEUMATIC PRESSURE TANKS
4 Claims, 4 Drawing Figs.

[52] U.S. Cl. .................................................. 138/30,
103/6
[51] Int. Cl. .................................................. F04b 39/00
[50] Field of Search .......................................... 137/207;
138/30; 103/6(AC)

[56] References Cited
UNITED STATES PATENTS

| 2,412,107 | 12/1946 | Tannehill | 103/6AC |
| 2,731,038 | 1/1956 | Purcell | 138/30 |
| 3,346,014 | 10/1967 | Jacuzzi | 138/30 |
| 3,406,722 | 10/1968 | Ruth | 138/30 |

Primary Examiner—Henry S. Jaudon

ABSTRACT: Pressure tank equipment for heating, cooling and water supply systems embodying a balloon-type inflatable membrane installed in a water tank in which water may flow into and out of the tank to maintain air under pressure externally of the balloon-shaped inflatable membrane in the tank out of contact with the water. Means are provided for inserting the inflatable membrane and attachments into said tank and removing the same therefrom.

TYPICAL SECTION

Patented Oct. 13, 1970

3,533,448

TYPICAL SECTION

TYPICAL SECTION

EXPLODED VIEW

HORIZONTAL TANK SECTION

HYDRO PNEUMATIC PRESSURE TANKS

This invention relates to heating, cooling and water supply systems and particularly to all pressure tank equipment for use in such systems.

In previously used types of conventional pneumatic tanks not having an inflatable membrane, it has been customary to pressurize the tank with air with which the water is in constant contact, whereby a sufficient pressure is maintained to discharge the water at a desired pressure at various locations throughout the system.

Water supply systems of this type are provided with water pumps which are actuated automatically when the pressure supply in the tank falls to a predetermined lower limit setting, then the pump is activated to replenish the water in the tank, thus also restoring the pressure therein to a predetermined upper limit, where the pump is shut off.

Water systems of this type heretofore commonly constructed are subject to the disadvantage that the air in contact with the water in the supply tank is gradually dissolved in the water, so after a time the air supply becomes exhausted and the tank is completely filled with water. Under these conditions, excessive pressure develops, due to the fact that water doesn't compress. This causes bursting of pipes, fitting and valves, etc. These are some of the problems that arise when water is confined under pressure within a steel tank without the inflatable membrane to take up the movement of the water within the system when it is suddenly controlled by the closing of all valves. At this time, the excessive pressures heretofore mentioned are created. Also, when water is heated, it expands and it is during these times that excessive pressures develop and without an air cushion to work against, causes damage to the water supply system.

Another object of the invention is to provide pressure tank equipment for water supply systems that have a far greater ability to absorb and expel a greater volume of water between two predetermined settings of a heretofore mentioned lower limit and an upper limit setting "up to 25 percent of the tank's total gross volume" which means fewer stops and starts for the pump, with a smoother operation and far less wear on the equipment.

The present invention also has another provision of pressure tank equipment in that this invention can be used in a very wide range of tanks and tank sizes from 12 gallons to 2000 gallons, more or less, in both horizontal and vertical tanks. This, coupled with the fact that this invention never lets a tank become completely water logged (no air in tank), makes it unique in pressure tank equipment. It will also absorb very high pressure with no damage to the invention.

The obvious advantages of the invention may best be understood from the following detailed description constituting a specification of the same when considered with the attached drawings showing a typical cross section of the pressure tank equipment in both horizontal and vertical positions embodying an exploded view of this invention.

Having the foregoing in mind, the primary objects of the present invention are to provide:

1. A float mounting and control system in pressure tanks that comprise an inverted balloon or inflatable membrane installed with the neck down and the body up with a nylon cord and strong rubber strap installed therein to help strengthen said inflatable membrane.

2. A pressure equalizing means consisting of a tube fastened to the side of said tank, open on each end, which equalizes the pressure evenly both above and below the installed inflatable membrane.

3. A pneumatic pressure control valve located at the outlet of the tank to keep a set minimum pressure within the tank at all times.

4. A spacing means to control buoyancy of said inflatable membrane in the horizontal tank to permanently position same from the top of tank to prevent rupturing.

Figure 1:
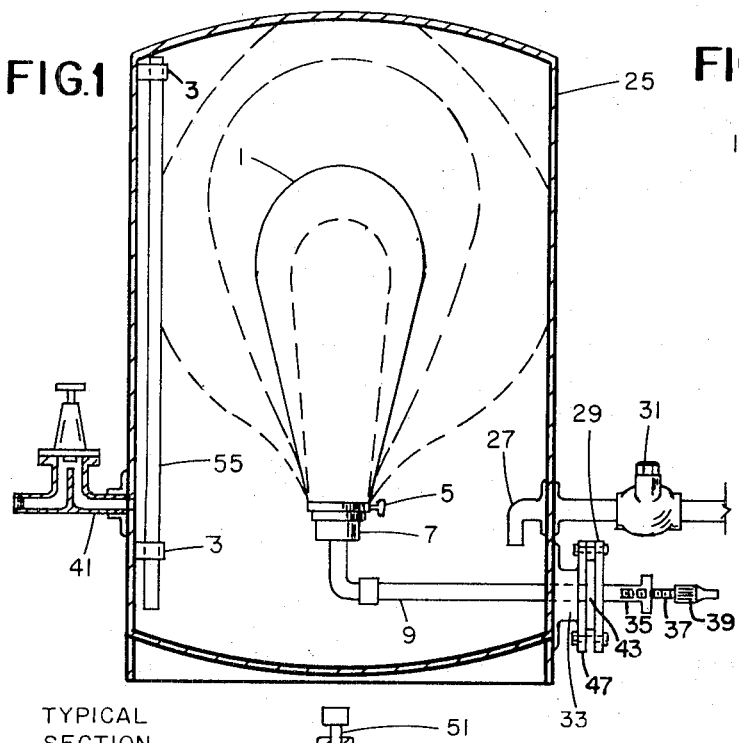
FIG. 1 is a schematic view showing the arrangement in a vertical tank.

Referring now to the drawings in greater detail, the pressure tank equipment of the invention includes a pressure tank designated as 25 in the vertical position and also shown as 25' in the horizontal position with an angle iron base 53 on horizontal type tanks only.

The tank is of usual configuration having a tubular body with closed upper and lower ends. An inflatable membrane 1 is mounted inside the tank and acts to keep the water under a constant pressure between set limits.

Figure 4:
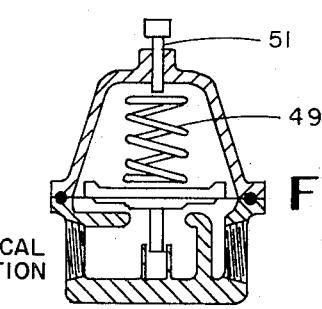
FIG. 4 is a sectional view of the safety valve assembly.

As shown in FIG. 1, tank 25 is provided with inlet means 27 having a downwardly-directed end and connected through valve 31 to the pump means (not shown). Water is supplied from the pump means through inlet 27 into the tank with valve 31 acting to prevent waterflow out of the tank and back into the pump. The pump is caused to be activated through the usual means controlled between pressure limits which form no part of the instant invention and are not further described. Also mounted on the side wall of tank 25 is a safety valve 41 which acts to prevent excessive pressure buildup in the tank so as to protect membrane 1 against rupture. Valve 41 is adjustably set at about 20 p.s.i. through spring 49 and control screw 51, see FIG. 4. Of course, any desirable setting may be obtained.

Mounted vertically along the inside wall of tank 25 by clamps 3 is pressure equalizing tube 55, the function of which is hereinafter described. Said tube is located so as to present an open and adjacent to the top and the bottom of the tank, or in the case of a horizontally disposed tank, said ends are located adjacent the ends thereof.

Float member or membrane 1 is secured to an L-shaped tube 9 which extends for approximately the center of the tank into the side wall thereof. At one end of tube 9 there is formed a flange 43. Casting 33, having an opening therethrough, is formed in the wall of the tank. There is formed at the outer end of casting 33 a flanged end portion 47. Tube 35, at one end mounts stem 37 of valve 39. At the other end of tube 35 is formed flange 29. To assemble the membrane in the tank, such is secured to tube 9, inserted through the opening in casting 33 and positioned. Flanges 47, 43 and 29 are respectively placed in abutting relationship, along with appropriate gaskets and by means of bolts inserted through holes provided in said flanges, the assembly is secured in position.

Figure 3:
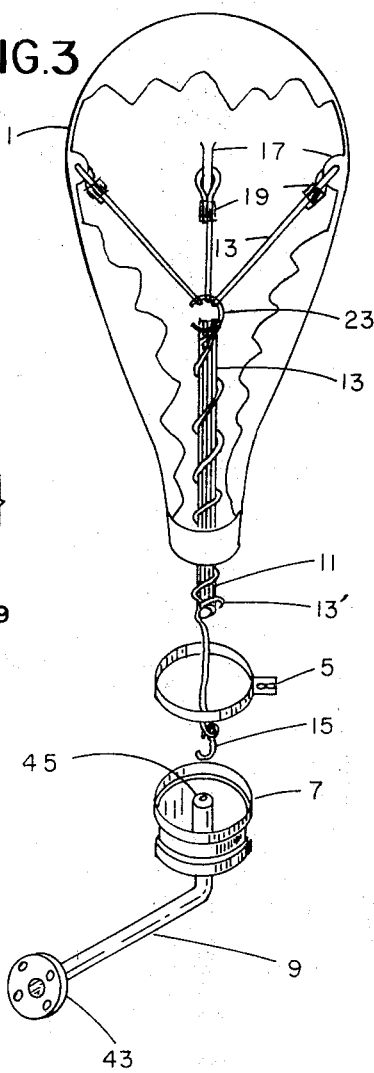
FIG. 3 is sectional view showing the membrane mounting and securing means.
Figure 2:
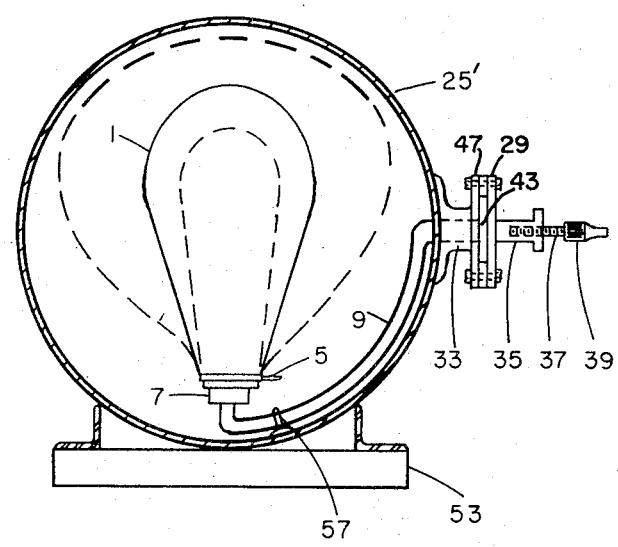
FIG. 2 is similar to FIG. 1 but shows a horizontal tank.

Tube 9, at its other end, is provided with mounting base 7 of sufficient length to allow the end portion of membrane 1 to be fitted thereover. The circumference of said base is slightly larger than the opening formed in the end portion of membrane 1. Clamp 5 is provided to fit over said end portion and to secure same in position about base 7. As shown in FIG. 3, there are provided shock absorbing or further securing means. Such means comprise forming along the upper interior walls of the membrane a plurality of ears 17. Nylon cords 13, pass through said ears and are clamped in position by lead clamps 19. The opposite ends of cords 13 are secured to ring 23. A length of rubber cord 11, wrapped with a nylon cord 13' is attached to ring 23. Wrapping cord 13' extends beyond the end of cord 11 and has attached thereto hook 15 which is inserted in hole 45 formed in base 7. There is relatively little danger of the membrane being pulled from tube 9 due to the pressure buildup during operation.

After the tank is assembled and the air is pumped into the membrane through the valve 39 about 1½ to 6 pounds of air is put into the membrane, depending upon the size and the displacement of the tank. When this is done, the balloon expands against the sides of the tank, shown by the dotted line in the outside of FIG. 1 in the attached drawing. In the large vertical tanks there are two or more of these inflatable membranes, one above the other, in the horizontal tanks up to six are installed side by side. The water comes from the pump through check valve 31 into the tank through openings 27, and as the water level rises in the tank, it is forced up through the tube 55 from bottom to top so as to equalize the pressure on the membrane which is expanded as shown in the drawing, and would otherwise prevent the water from passing therearound. As the tank fills with water the membrane is gradually compressed away from the tank as the pump forces more water into the tank and the pressure builds until the desired pressure limit is reached. As the water is drawn off through any outlet (not shown) connected with the system, the pressure drops inside the tank and the inflatable membrane expands maintaining pressure on the water until a low point is reached. The pump is then automatically activated and the cycle is started again.

In conclusion, and as a general description of this invention, it may be described as pressure tank equipment for a water supply system comprising a tank having openings adjacent to the bottom thereof, pressure equalizing means within said tank, comprising a pipe attached to the side wall of said tank with its end portions slightly spaced from each end wall of said tank, a flexible inflatable floating membrane having an open end portion control valve means connected with said floating membrane, an inlet pipe, said floating membrane being secured to said inlet pipe at the neck portions in such a manner as to be retained in a fixed position remote of the walls of said tank, shock absorber means being attached to said float and to said inlet pipe to further aid in retaining said float in position.

I claim:

1. Pressure tank equipment for water supply systems comprising a tank having openings therein, pressure equalizing means comprising a tube attached to the side wall of said tank with its end portions slightly spaced from the end walls of said tank, an inflatable membrane having a downwardly disposed open neck portion, mounting means for said membrane including a tube secured at one end to the tank wall and having at the other end means receiving said neck portion, shock absorbing means disposed inwardly of said membrane and further securing same to said end receiving means.

2. Pressure tank equipment according to claim 1 wherein the shock absorbing means comprises a rubber cord attached to the top portion of the membrane and to said end receiving means.

3. Pressure tank equipment according to claim 1 wherein said tube is provided with valve means and is operative to vary the air pressure of said membrane.

4. Pressure tank equipment according to claim 1 wherein safety valve means are provided to insure against excess pressure in said tank.